(12) United States Patent
Lyu et al.

(10) Patent No.: US 12,174,292 B2
(45) Date of Patent: Dec. 24, 2024

(54) NOISE SUPPRESSION METHOD AND SYSTEM FOR INVERSE SYNTHETIC APERTURE RADAR MICRO-CLUSTER OBJECTS USING GENERATIVE ADVERSARIAL NETWORK

(71) Applicant: Yangtze Delta Region Institute (Huzhou), University of Electronic Science and Technology of China, Huzhou (CN)

(72) Inventors: Haitao Lyu, Xinyang (CN); Jiang Qian, Chengdu (CN); Junzheng Jiang, Guilin (CN); Minfeng Xing, Chengdu (CN)

( * ) Notice: Subject to any disclaimer, the term of this patent is extended or adjusted under 35 U.S.C. 154(b) by 280 days.

(21) Appl. No.: 17/989,162

(22) Filed: Nov. 17, 2022

(65) Prior Publication Data

US 2023/0152444 A1 May 18, 2023

(30) Foreign Application Priority Data

Nov. 18, 2021 (CN) .......................... 202111369184.5

(51) Int. Cl.
*G01S 13/90* (2006.01)
*G01S 7/41* (2006.01)

(52) U.S. Cl.
CPC .......... *G01S 13/9027* (2019.05); *G01S 7/417* (2013.01); *G01S 13/9064* (2019.05)

(58) Field of Classification Search
CPC ............. G01S 13/9027; G01S 13/9064; G01S 7/417; G06T 5/73
See application file for complete search history.

(56) References Cited

U.S. PATENT DOCUMENTS

| 11,610,284 B2* | 3/2023 | Cowan | ................ G06F 18/214 |
| 2021/0003699 A1* | 1/2021 | Zhai | ................... G01S 13/9027 |
| 2021/0192762 A1* | 6/2021 | Guan | ...................... G06T 15/06 |

OTHER PUBLICATIONS

Notice to Allow of CN202111369184.5, Mailed Jul. 9, 2024.

* cited by examiner

*Primary Examiner* — Peter M Bythrow
*Assistant Examiner* — Nazra Nur Waheed

(57) ABSTRACT

A noise suppression method and system for Inverse Synthetic Aperture Radar micro-cluster objects using a generative adversarial network (GAN) are provided. The method includes: constructing the GAN, including a generator and a discriminator; obtaining and inputting noisy simulation data into the generator to obtain a first output, comparing the first output with noiseless simulation data to obtain a first generator loss, inputting the first output and the distribution function into the discriminator for denoising discrimination to obtain a first discriminant result, and determining a second generator loss according to the first generator loss and the first discriminate result; and obtaining measured data and inputting the measured data into the generator to obtain a second output, inputting the second output to the discriminator to obtain a second discriminant result, and determining a generator loss according to the second generator and the second discriminate result.

8 Claims, 13 Drawing Sheets

NOISE SUPPRESSION METHOD AND SYSTEM FOR INVERSE SYNTHETIC APERTURE RADAR MICRO-CLUSTER OBJECTS USING GENERATIVE ADVERSARIAL NETWORK

TECHNICAL FIELD

The present disclosure relates to the technical field of object detection, and in particularly, to a noise suppression method and system for Inverse Synthetic Aperture Radar (ISAR) micro-cluster objects using a generative adversarial network (GAN).

DESCRIPTION OF RELATED ART

Synthetic Aperture Radar (SAR) moving object detection is widely applied. For inverse synthetic aperture radar (ISAR) noise suppression, an adaptive noise suppression method is usually used in an imaging process, and a threshold is set to filter a noise. Most of other methods can only use traditional filtering algorithms. For example, the methods applied to a SAR speckle noise suppression method mainly uses a wavelet transform algorithm, a Lee filter algorithm, a frost filter algorithm, a sigma filter algorithm, a gamma-map filter algorithm, and improved algorithms thereof.

Most of existing technologies are based on traditional filtering algorithms. When such filtering algorithms are used for denoising micro-clustered objects, not only denoising effect is not well, but also the micro-clustered objects are processed too smoothly, resulting in overlapping of closer objects of the micro-clustered objects.

SUMMARY

In view of this, objectives of the present disclosure are to provide a method and system for ISAR micro-cluster objects using a GAN. The method combines the GAN to realize noise filtering of signals of the ISAR micro-cluster objects and improve a range resolution of the ISAR micro-cluster objects without a large amount of data training.

To achieve the above objectives, the present disclosure provides the following technical solutions.

An embodiment of the present disclosure provides a noise suppression method for ISAR micro-cluster objects using a GAN, which includes: constructing the GAN, the GAN including a generator and a discriminator; obtaining noisy simulation data of the ISAR micro-cluster objects and inputting the noisy simulation data into the generator to obtain a first output G(z1), comparing the first output G(z1) with noiseless simulation data x of the ISAR micro-cluster objects to obtain a first generator loss, inputting the first output G(z1) and the noiseless simulation data x into the discriminator for denoising discrimination to obtain a first discriminant result, and determining a second generator loss according to the first generator loss and the first discriminate result; and obtaining measured data of the ISAR micro-cluster objects and inputting the measured data into the generator to obtain a second output G(z2), inputting the second output G(z2) to the discriminator to obtain a second discriminant result, and determining a generator loss according to the second generator and the second discriminate result, to achieve noise suppression for the ISAR micro-cluster objects.

In an embodiment of the present disclosure, a loss function $Loss_m$ of the measured data is as follows:

$$\max_D V(D, G) = E_{z2 \sim p_{measurement(z2)}}[\log(1 - D(G(z2)))],$$

where $p_{measurement}(z2)$ represents a distribution function of the measured data; $D(G(z2))$ represents an output of the measured data after passing through the generator and then through the discriminator; and z2 represents the measured data.

In an embodiment of the present disclosure, a loss function $Loss_s$ of the noisy simulation data is as follows:

$$\min_G \max_D V(D, G) =$$
$$E_{x \sim p_{data(x)}}[\log D(x)] + E_{z1 \sim p_{measurement(z1)}}[\log(1 - D(G(z1)))],$$

where $E(*)$ represents a distribution function mathematical expectation; $D(G(z1))$ represents an output of the noisy simulation data after passing through the generator and then through the discriminator; $D(x)$ represents an output of the noiseless simulation data after passing through the discriminator; $p_{data}(x)$ represents the distribution function of the noiseless simulation data; $p_{simulation}(z1)$ represents a distribution function of the noisy simulation data; x represents the noiseless simulation data; and z1 represents the noisy simulation data.

In an embodiment of the present disclosure, a loss function of the adversarial network GAN is as follows: $Loss_{GAN} = Loss_m + Loss_s$, where $Loss_{GAN}$ represents the loss function of the adversarial network; $Loss_m$ represents a loss function of the measured data; and $Loss_s$ represents a loss function of the noisy simulation data.

An embodiment of the present disclosure provides noise suppression system for ISAR micro-cluster objects using a GAN, including: a memory, stored a computer program therein; and a processor, where the processor is configured to execute the computer program to carry out a noise suppression method for ISAR micro-cluster objects using a GAN, the method including: constructing the GAN, the GAN including a generator and a discriminator; obtaining noisy simulation data of the ISAR micro-cluster objects and inputting the noisy simulation data into the generator to obtain a first output G(z1), comparing the first output G(z1) with noiseless simulation data x of the ISAR micro-cluster objects to obtain a first generator loss, inputting the first output G(z1) and the noiseless simulation data x into the discriminator for denoising discrimination to obtain a first discriminant result, and determining a second generator loss according to the first generator loss and the first discriminate result; and obtaining measured data of the ISAR micro-cluster objects and inputting the measured data into the generator to obtain a second output G(z2), inputting the second output G(z2) to the discriminator to obtain a second discriminant result, and determining a generator loss according to the second generator and the second discriminate result, to achieve noise suppression for the ISAR micro-cluster objects.

In an embodiment of the present disclosure, a loss function $Loss_m$ of the measured data is as follows:

$$\max_D V(D, G) = E_{z2 \sim p_{measurement(z2)}}[\log(1 - D(G(z2)))],$$

where $p_{measurement}(z2)$ represents a distribution function of the measured data; $D(G(z2))$ represents an output of the measured data after passing through the generator and then through the discriminator; and $z2$ represents the measured data.

In an embodiment of the present disclosure, a loss function $Loss_s$ of the noisy simulation data is as follows:

$$\min_G \max_D V(D, G) = E_{x \sim p_{data}(x)}[\log D(x)] + E_{z1 \sim p_{simulation}(z1)}\log(1 - D(G(z1)))],$$

where $E(*)$ represents a distribution function mathematical expectation; $D(G(z1))$ represents an output of the noisy simulation data after passing through the generator and then through the discriminator; $D(x)$ represents an output of the noiseless simulation data after passing through the discriminator; $p_{data}(x)$ represents the distribution function of the noiseless simulation data; $p_{simulation}(z1)$ represents a distribution function of the noisy simulation data; x represents the noiseless simulation data; and z1 represents the noisy simulation data.

In an embodiment of the present disclosure, a loss function of the adversarial network GAN is as follows: $Loss_{GAN} = Loss_m + Loss_s$, where $Loss_{GAN}$ represents the loss function of the adversarial network; $Loss_m$ represents a loss function of the measured data; and $Loss_s$ represents a loss function of the noisy simulation data.

The present disclosure has at least following beneficial effects.

The noise suppression method system for ISAR micro-cluster objects using the GAN are provided. In the traditional generative adversarial network, not only the strength of the real signal but also the strength of the noise are continuously improved in the training process, and an ability thereof to suppress noise is limited. In contrast, in the method of the present disclosure, through adding the measured data to the training process, noise suppression can be realized, while strengths of the signals of the bird-cluster objects are improved. With the method of the present disclosure, not only the noise can be eliminated well, but also the strengths of the signals of the bird-cluster objects can be improved. Further, a range resolution can be improved to some extent. In addition, the method of the present disclosure also avoids the problem that deep learning requires a lot of data training, in contrast, only a small amount of simulation data is required to denoise during the training process.

The method combines the GAN to realize noise filtering of signals of the ISAR micro-cluster objects and improve a range resolution of the ISAR micro-cluster objects without a large amount of data training. The measured data can be denoised only using a small amount of simulation data. The generative adversarial network of the present disclosure can achieve a stable denoising effect, and the range resolution is improved to some extent.

Other advantages, objectives and features of the present disclosure will be set forth in the following specification to some extent. The other advantages, the objectives and the features are apparent for those skilled in the art based on the following investigation or study to some extent, or may be taught from the practice of the present disclosure. The objectives and other advantages of the present disclosure can be realized and obtained by the following description.

BRIEF DESCRIPTION OF THE DRAWINGS

In order to make the objectives, the technical solutions and the beneficial effects of the present disclosure clearer, the present disclosure provides the following drawings for illustration.

FIG. 2A and FIG. 2B illustrate simulated signals of bird-cluster objects after range pulse compression, in which FIG. 2A illustrates noiseless simulation data of the bird-cluster objects, and FIG. 2B illustrates noisy simulation data of the bird-cluster objects.

DETAILED DESCRIPTION OF EMBODIMENTS

The present disclosure is further described hereinafter combined with accompanying drawings and specific embodiments, so that those skilled in the art can better understand the present disclosure and implement the present disclosure, but the specific embodiments hereinafter are not intended to limit the present disclosure.

First Embodiment

A noise suppression method for Inverse Synthetic Aperture Radar (ISAR) micro-cluster objects using a generative adversarial network (GAN) is provided according to an embodiment of the present disclosure, which includes steps 1 to step 3.

Step 1. Analysis of a Characteristic of a Noise of the ISAR Micro-Cluster Objects As shown in FIG. 1A through FIG. 1F, FIG. 1A through FIG. 1F illustrate signals of bird-cluster objects after range pulse compression. An ISAR is used to detect the bird-cluster objects beyond a longer distance. The signals of the bird-cluster objects after the range pulse compression are dense and close to each other, an intensity of a noise is relatively close to an intensity of the signals, which makes it difficult to determine a quantity of the bird-cluster objects, and has a great impact on a subsequent detection of the bird-cluster objects. Further, if a traditional filtering algorithm is used to suppress the noise, the signals of the bird-cluster objects will be processed too smoothly, and signals of some birds of the bird-cluster objects will overlap with each other.

Step 2. Simulation of the Signals of the Bird-Cluster Objects

Figure 1A:
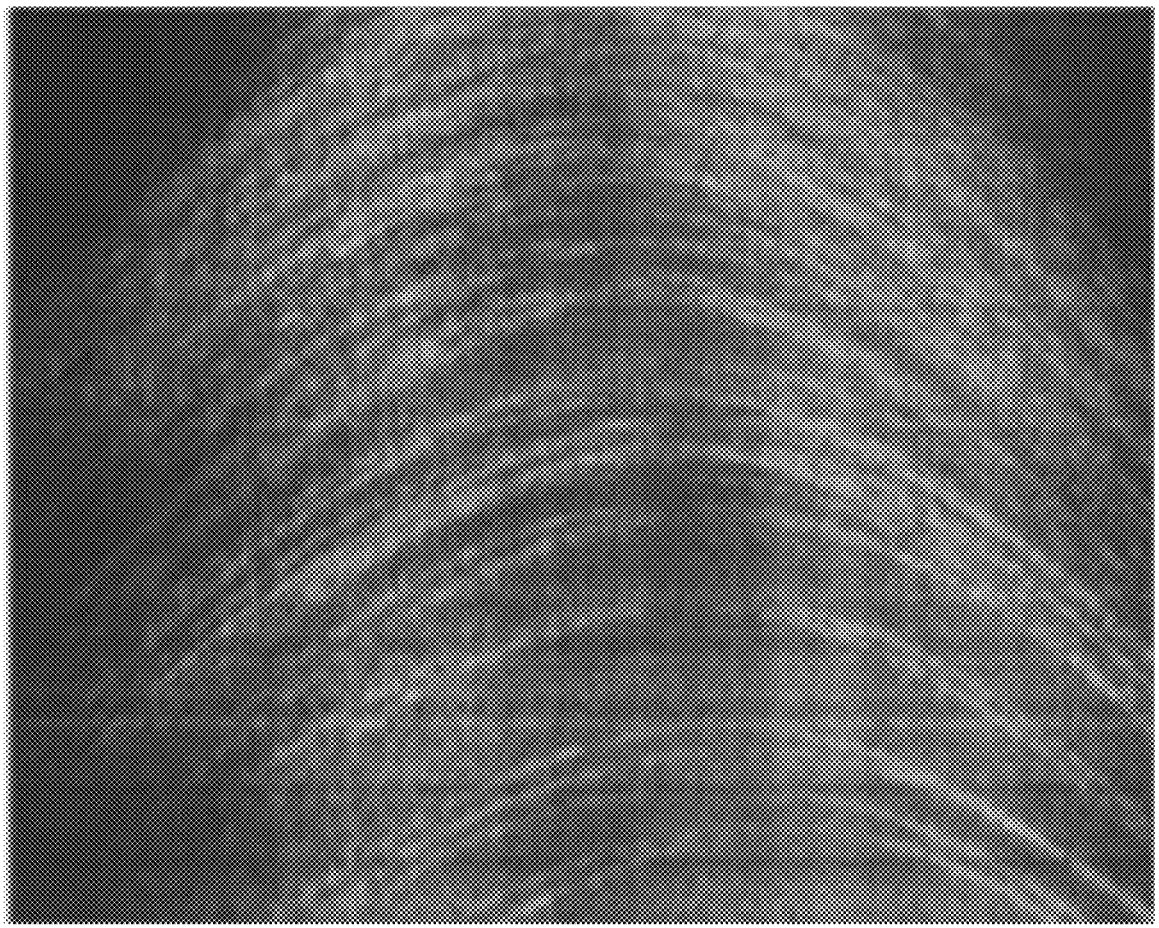
FIG. 1A through FIG. 1F illustrate signals of bird-cluster objects after range pulse compression.
Figure 1B:
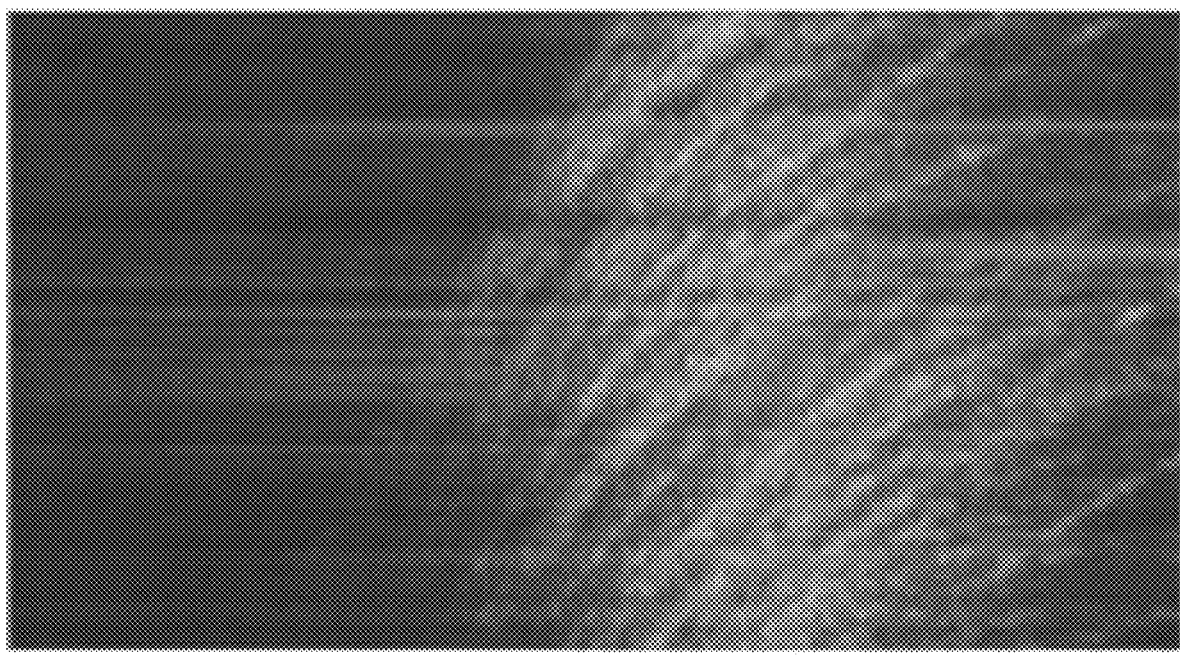
Figure 1C:
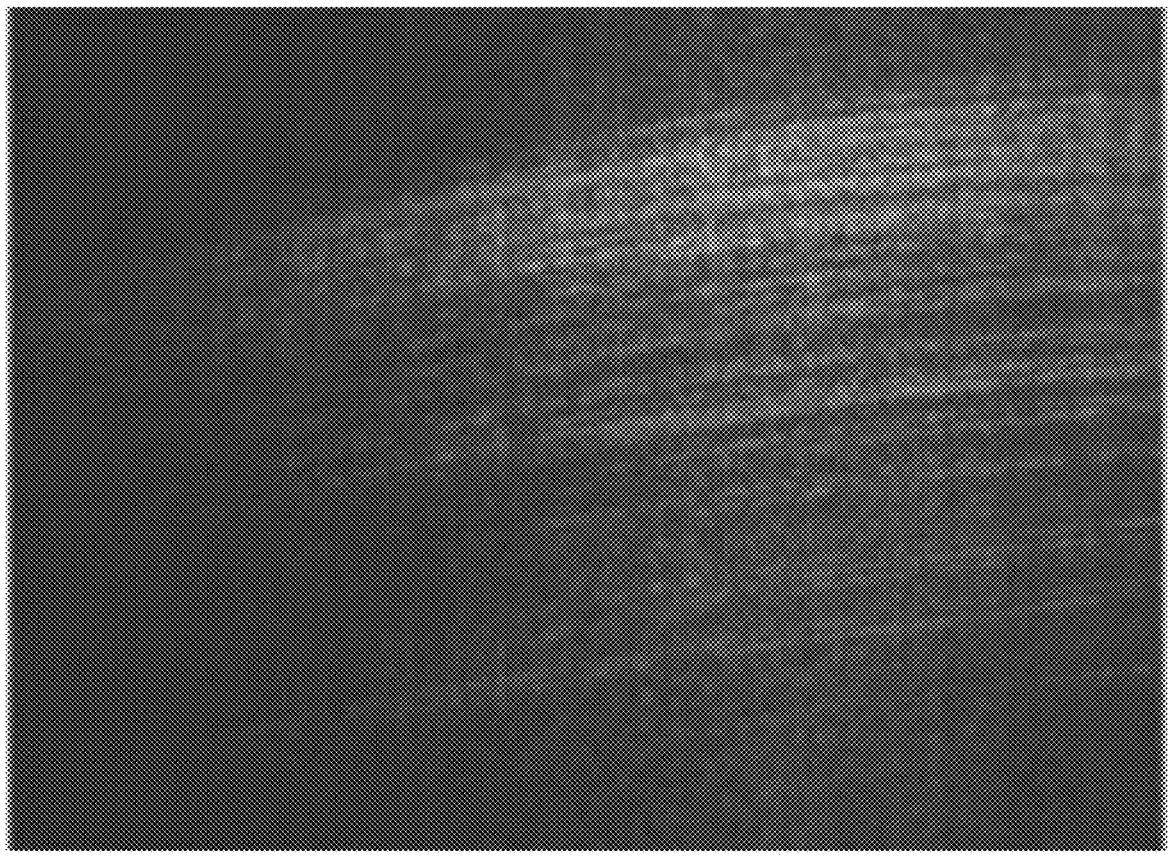
Figure 1D:
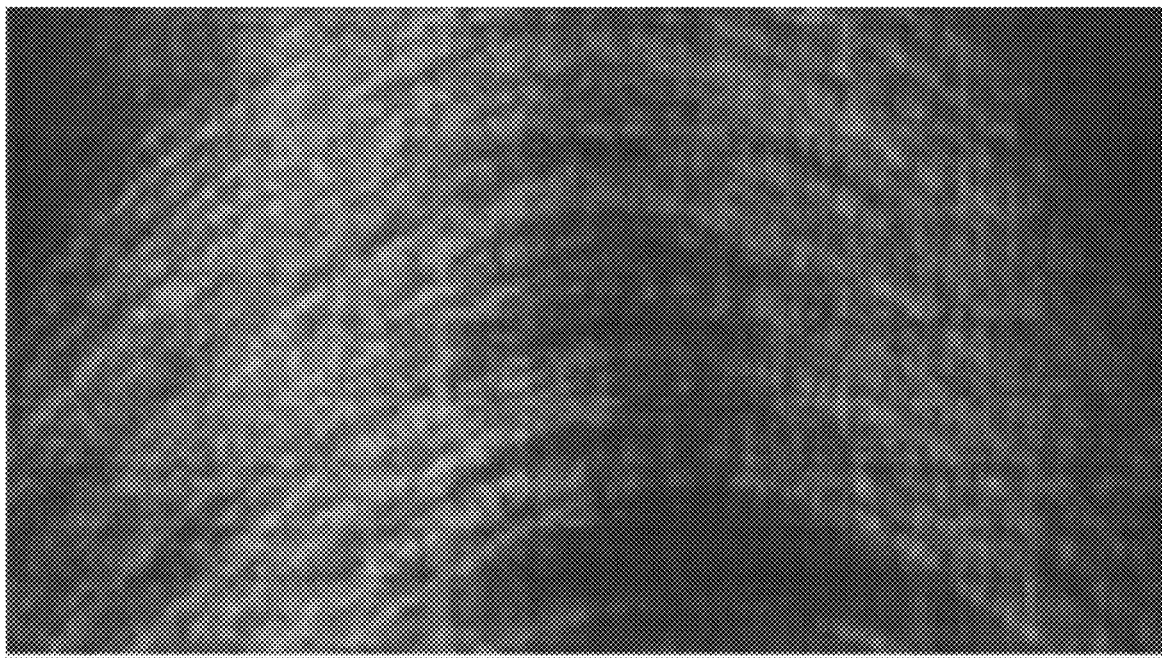
Figure 1E:
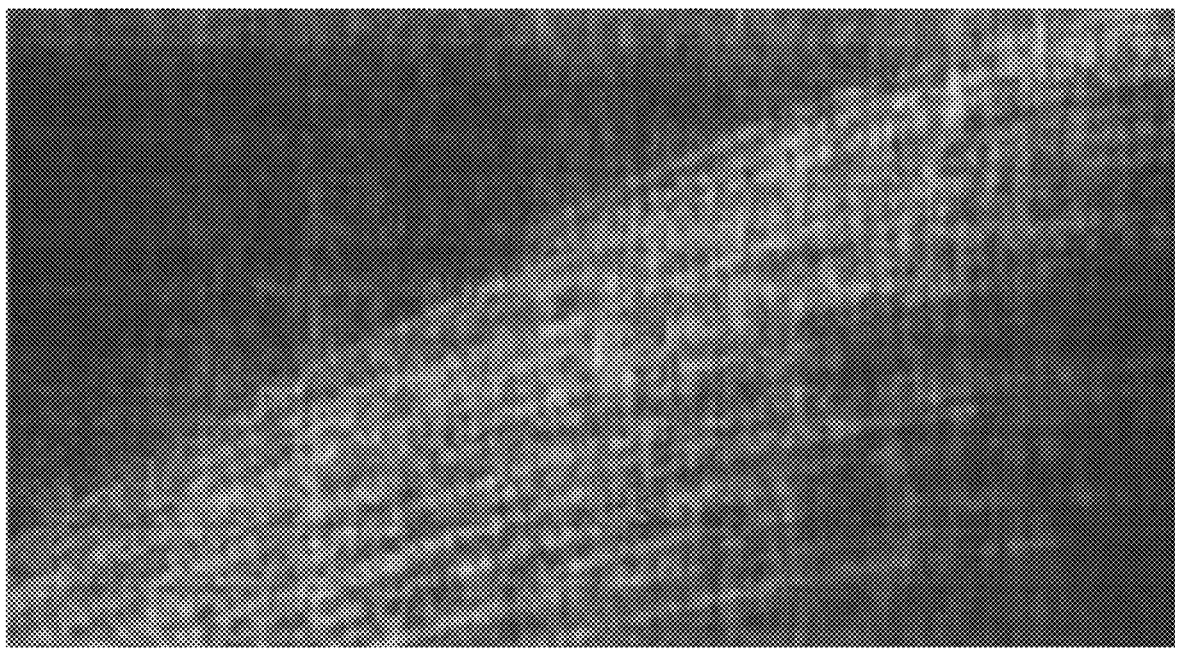
Figure 1F:
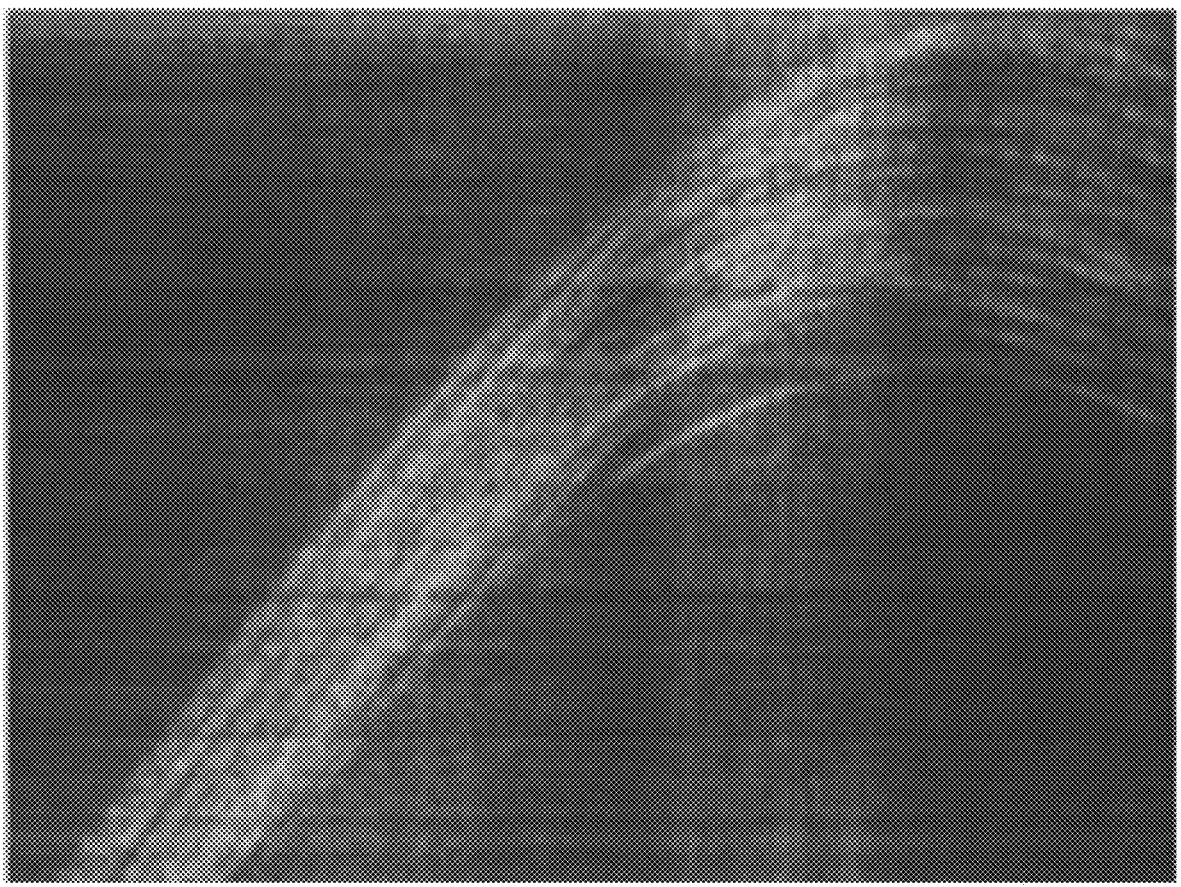
Figure 2A:
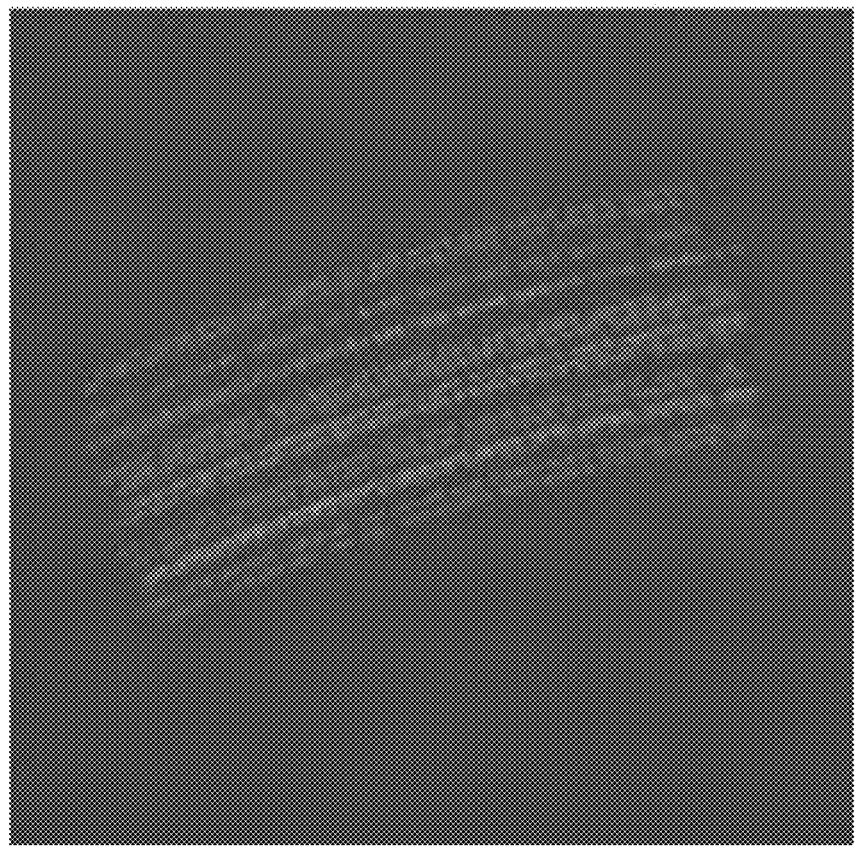
Figure 2B:
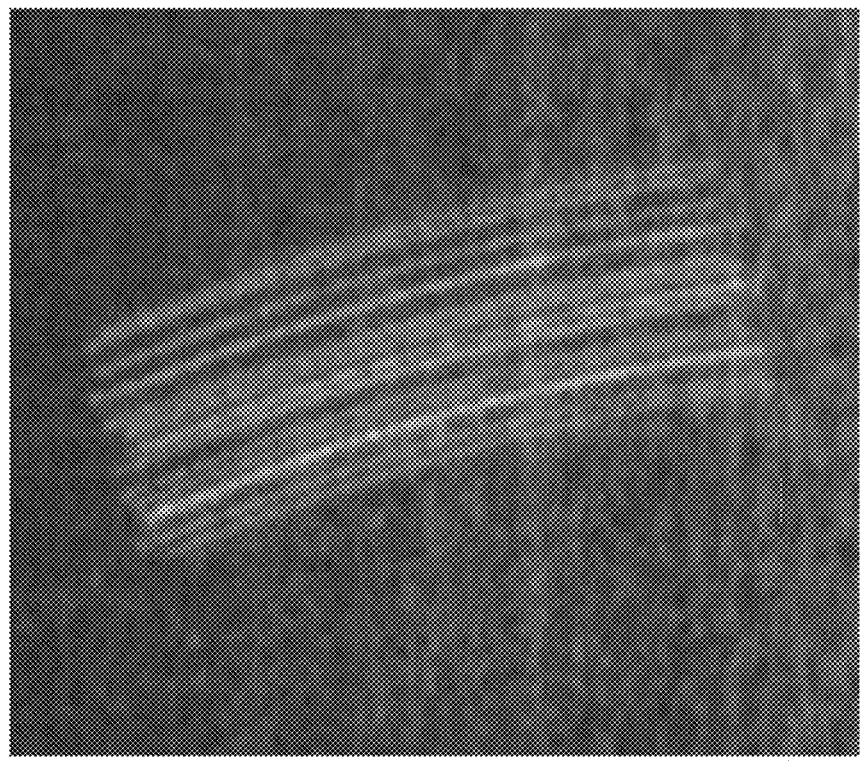

During measuring data of micro-cluster objects, it is difficult to obtain noiseless data, that is to say the measured data is generally not the noiseless data. However, when a network is trained, the noiseless data is required to act as a label. As such, the noiseless data is generated using a simulation manner. Specifically, radar signals of the micro-cluster objects are simulated through simulation, and a range pulse compression is performed on the radar signals. Further, noises of different signal-to-noise ratios are added to the radar signals of the micro-cluster objects, and then range-matched filtering is performed, to obtain a noisy pulse compression result. As shown in FIG. 2A and FIG. 2B, simulated signals of bird-cluster objects after range pulse compression are illustrated, in which FIG. 2A illustrates noiseless simulation data of the bird-cluster objects, and FIG. 2B illustrates noisy simulation data of the bird-cluster objects.

Step 3. Design of GAN

Figure 3:
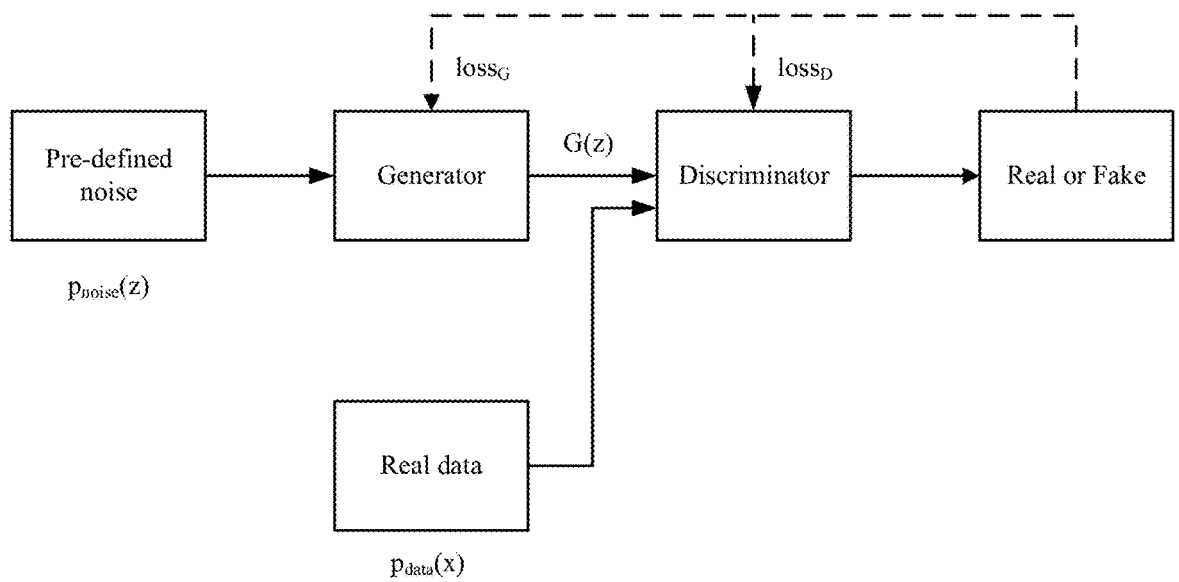
FIG. 3 illustrates a data flow diagram of a traditional generative adversarial network.

A GAN is used to eliminate a noise of the ISAR micro-cluster objects. The GAN includes G and D. G refers to a generator, which is configured to generate an image. A function of G is to suppress the noise of the ISAR micro-cluster objects. D refers to a discriminator, which is configured to determine whether the image generated by the generator is "real" or "fake". A function of the discriminator is to determine whether denoising is realized the generator. If it is determined that denoising is realized, i.e., "denoising", the image is determined to be "real"; and if it is determined that denoising is not realized, i.e., "not denoising", the image is determined to be "fake", which can be simply regarded as a game process between two networks. The generator is configured to obtain a generated image $G(z)$ according a distribution function $p_{noise}(z)$ of a noise and a generator loss $loss_G$. The generated image $G(z)$ indicates a noise suppression image of the micro-cluster objects. The discriminator is configured to obtain a real/fake result (also referred to as Real or Fake) according to a distribution function $p_{data}(x)$ of real data, the generated image $G(z)$, and a discriminator loss $loss_D$. As shown in FIG. 3, a data flow diagram of a traditional generative adversarial network is illustrated.

Specifically, a loss function of the traditional generative adversarial network is as follows:

$$\min_G \max_D V(D, G) = E_{x \sim p_{data}(x)}[\log D(x)] + E_{z \sim p_{noise}(z)}[\log(1 - D(G(z)))],$$

where $p_{noise}(z)$ represents the distribution function of the noise, which is pre-defined; $p_{data}(x)$ is the distribution function of the real data; E(*) represents a distribution function mathematical expectation; $D(x)$ represents an output of the real data after passing through the discriminator; $D(G(z))$ represents an output of the noise after passing through the generator and then through the discriminator; $loss_G$ represents the generator loss; and $loss_D$ represents the discriminator loss.

In a practical application, $p_{noise}(z)$ represents a distribution function of simulation data to be denoised (also referred to as noisy simulation data), and $p_{data}(x)$ represents a distribution function of noiseless simulation data. However, when the traditional generative adversarial network is used for noise suppression, although a strength of the real data is continuously improved, a strength of the noise is also improved to a certain extent, as such, a good noise suppression effect cannot be achieved. The reason for that is: the measured data is quite different from the simulation data, and cannot be completely consistent with the simulation data. If a training result of the simulation data is directly used for testing, an effect is limited. The present disclosure can better solve this problem by adding the measured data into a training process of a neural network.

Figure 4:
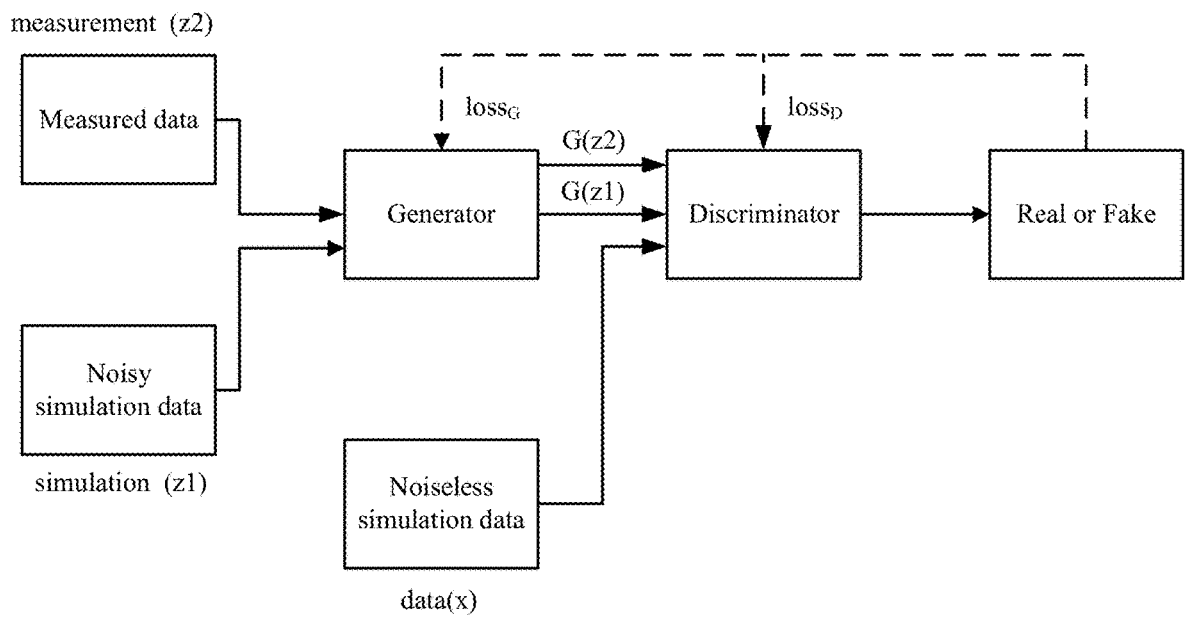
FIG. 4 illustrates a data flow diagram of an improved generative adversarial network.
Figure 5A:
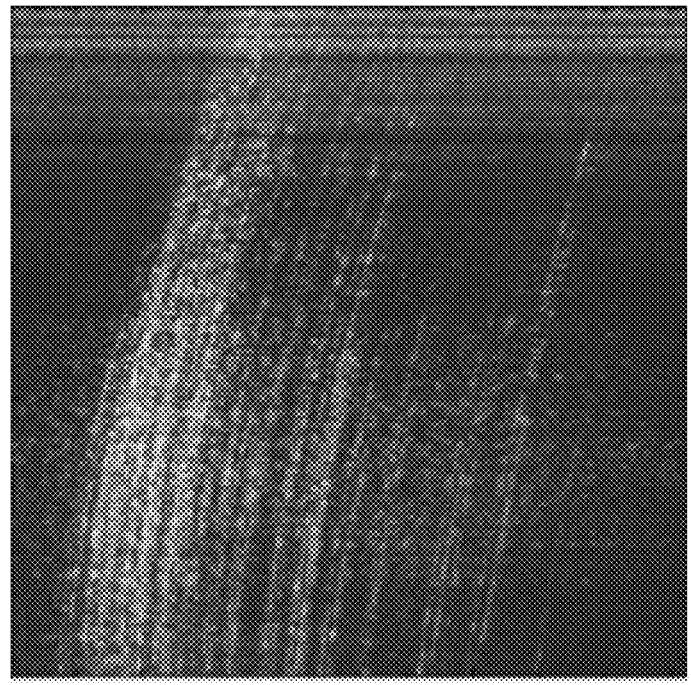
FIG. 5A through FIG. 5E illustrate a convergence process of an improved generative adversarial network.
Figure 5B:
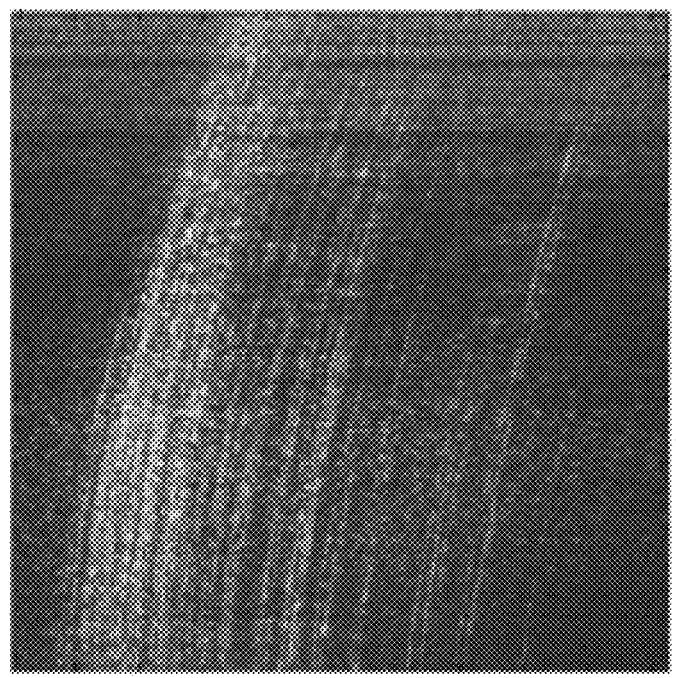
Figure 5C:
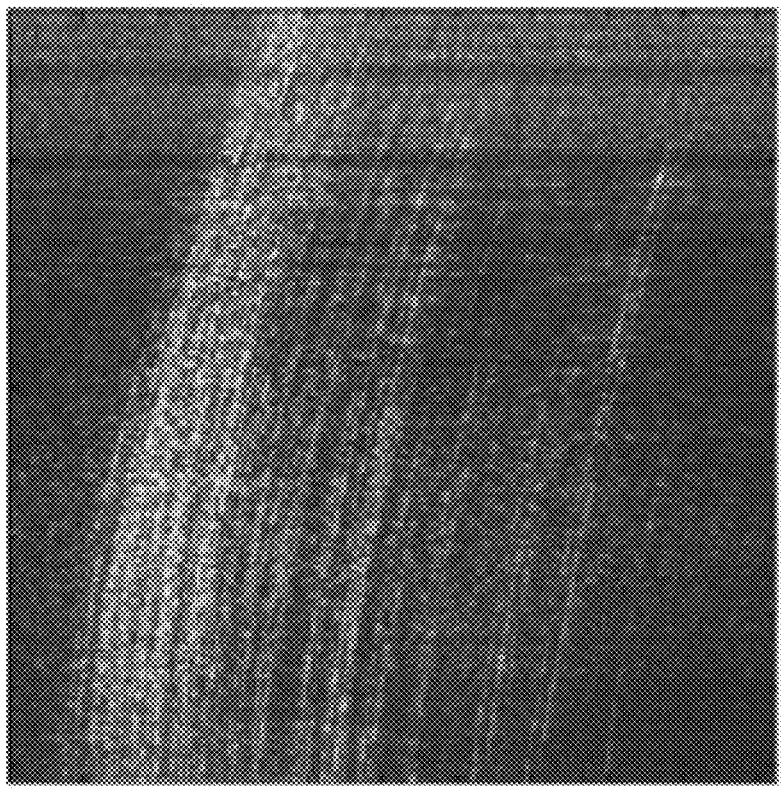
Figure 5D:
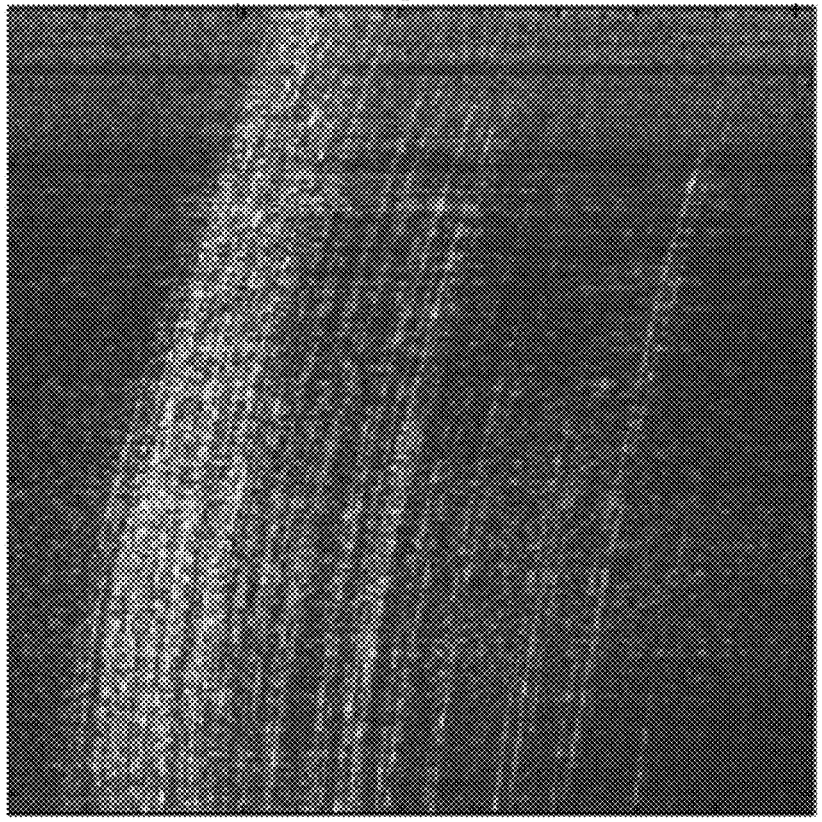
Figure 5E:
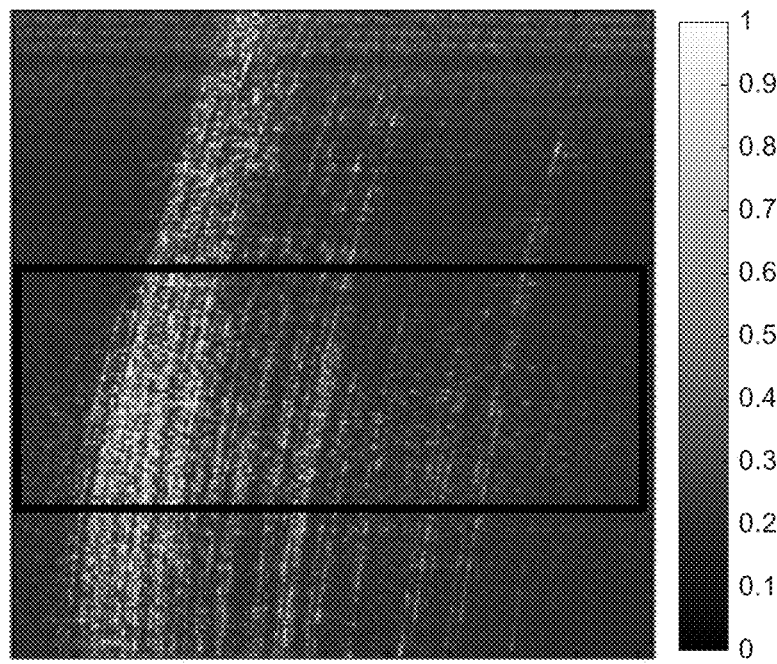
Figure 6A:
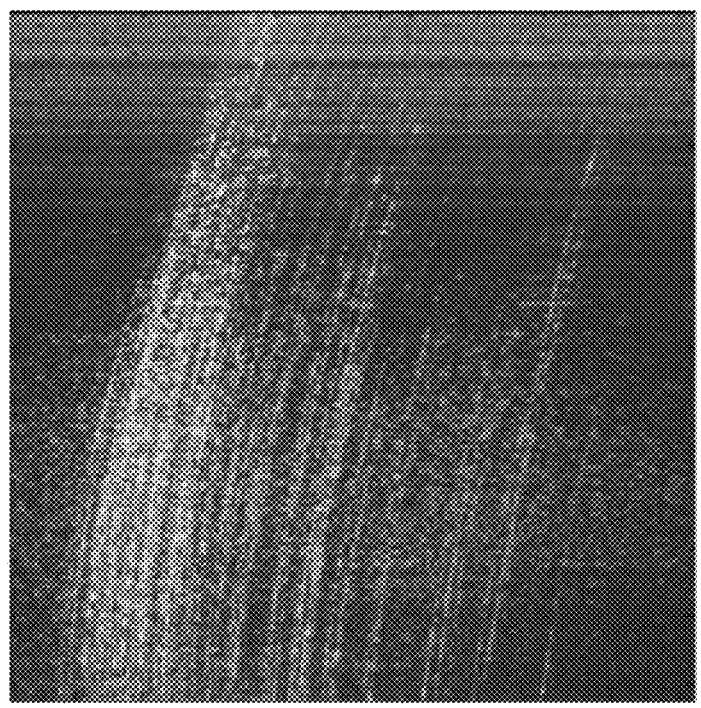
FIG. 6A through FIG. 6E illustrate a convergence process of a traditional generative adversarial network.
Figure 6B:
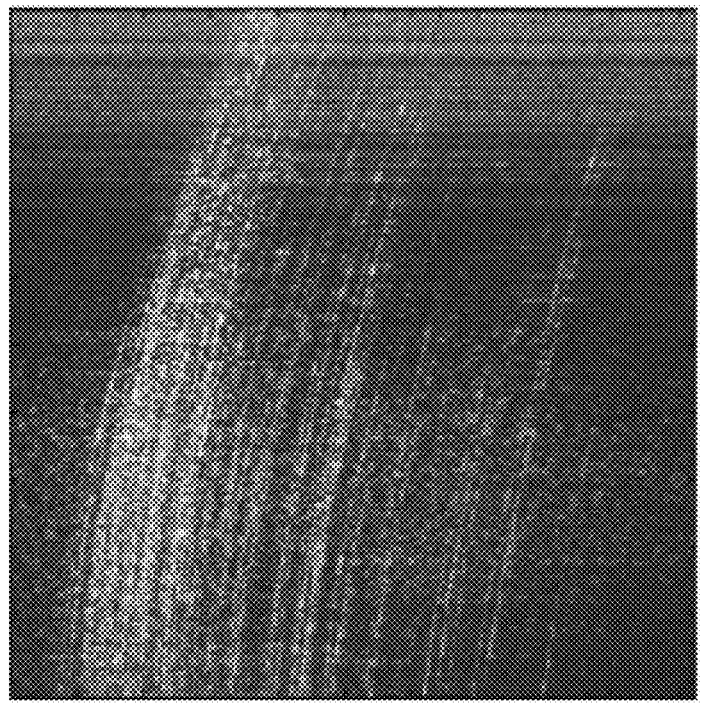
Figure 6C:
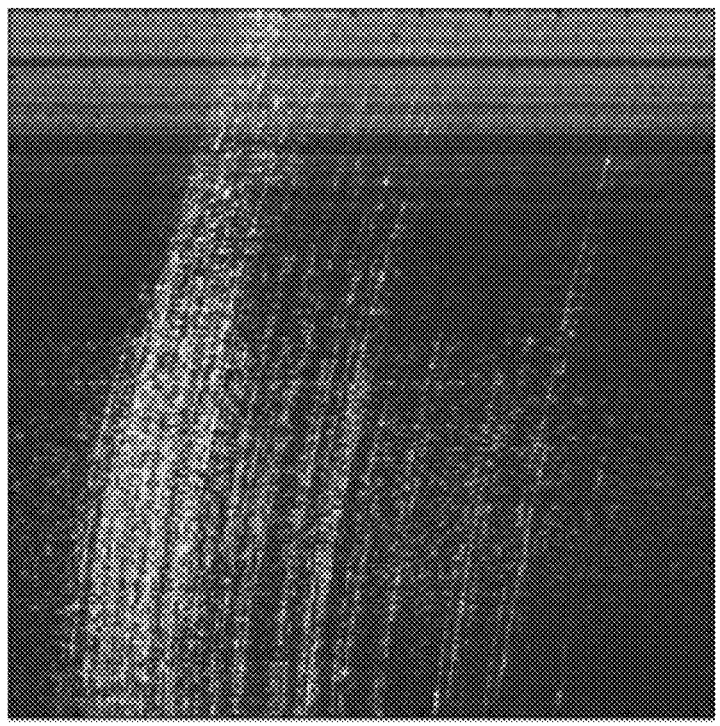
Figure 6D:
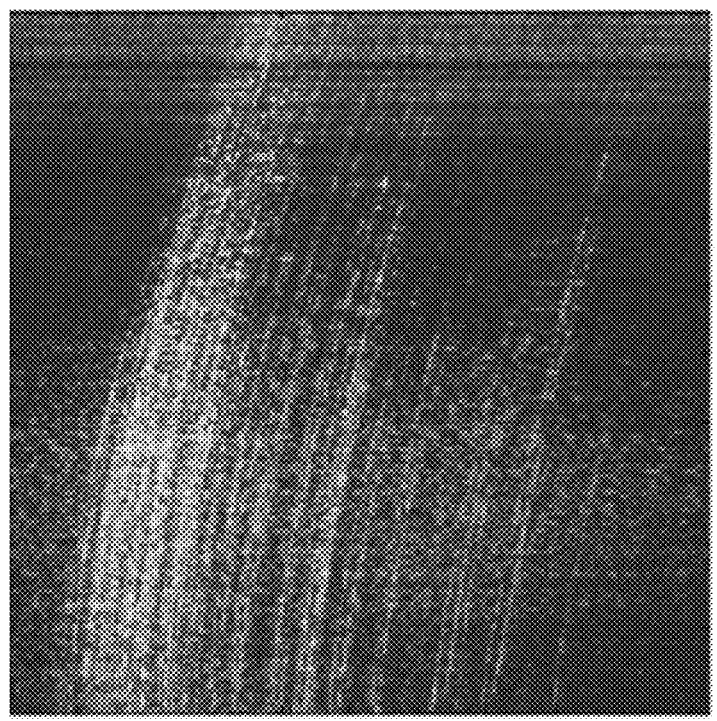
Figure 6E:
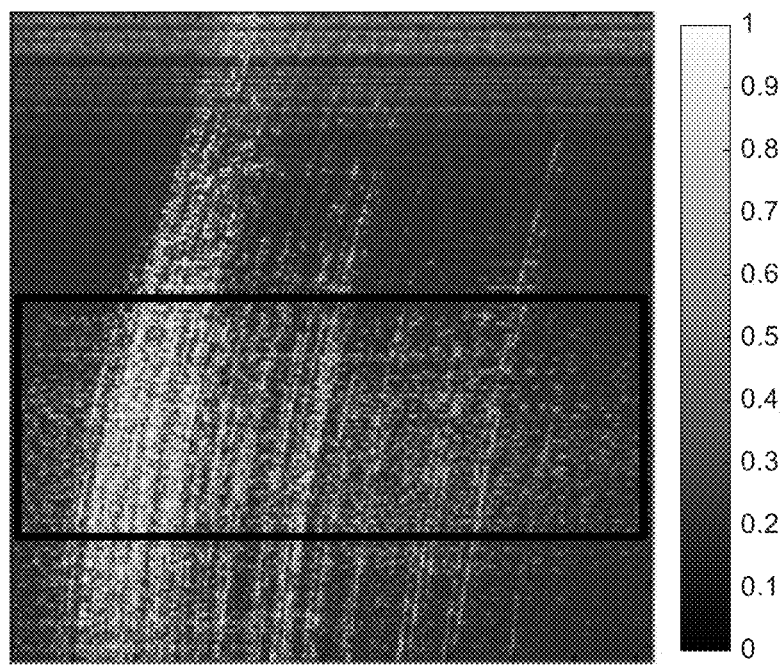
Figure 7A:
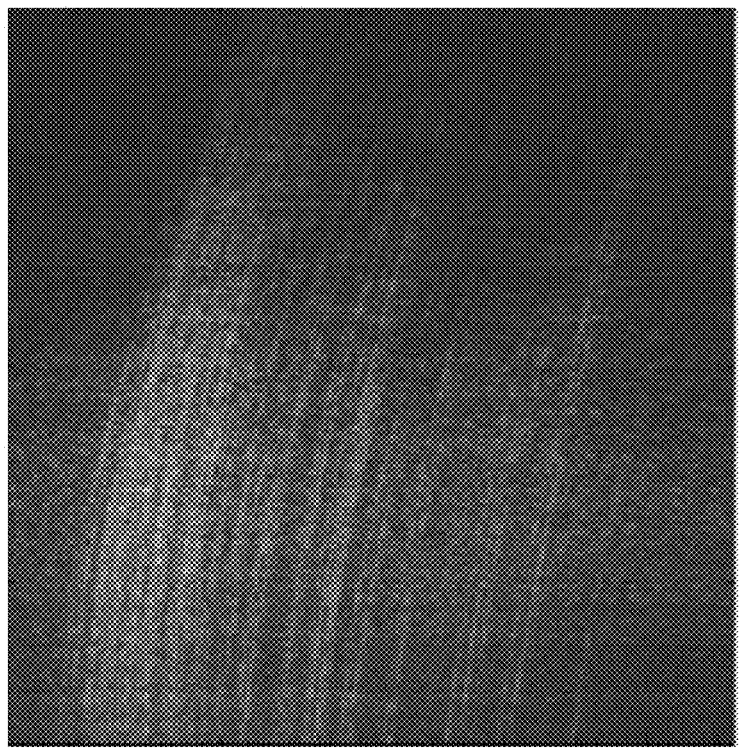
FIG. 7A through FIG. 7F illustrate noise suppression results.
Figure 7B:
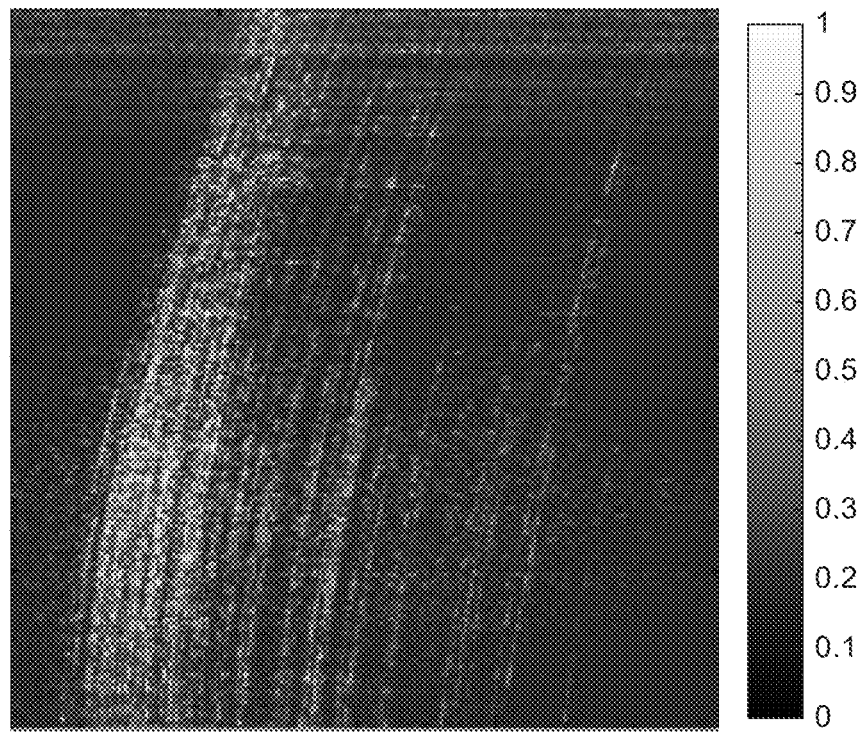
Figure 7C:
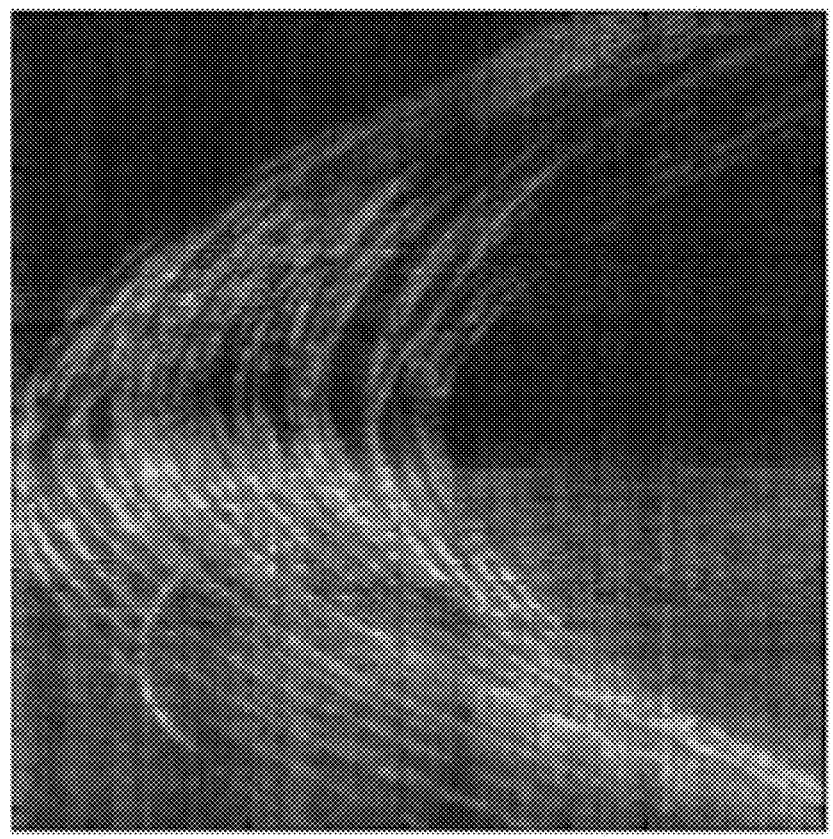
Figure 7D:
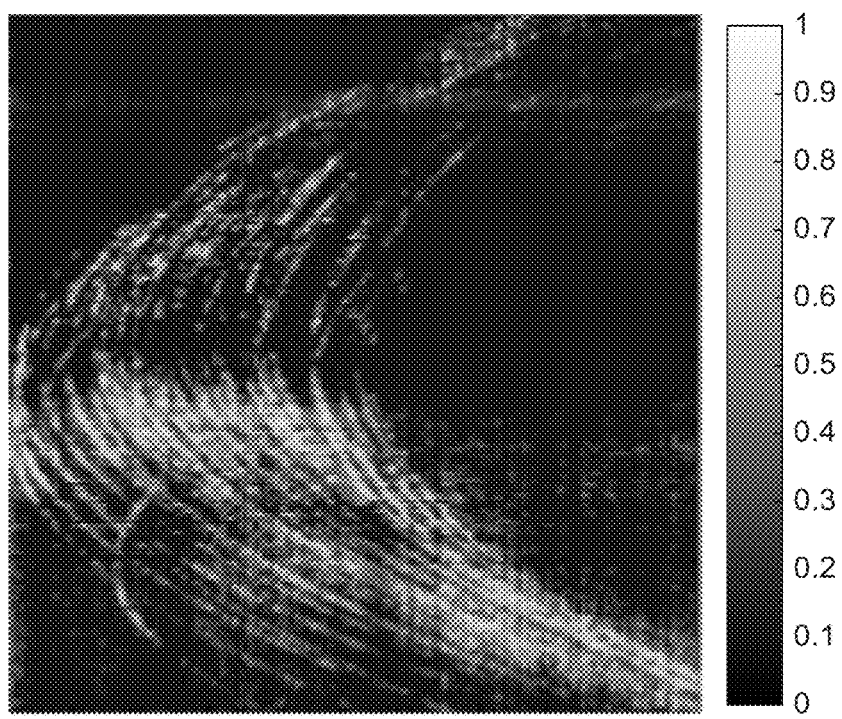
Figure 7E:
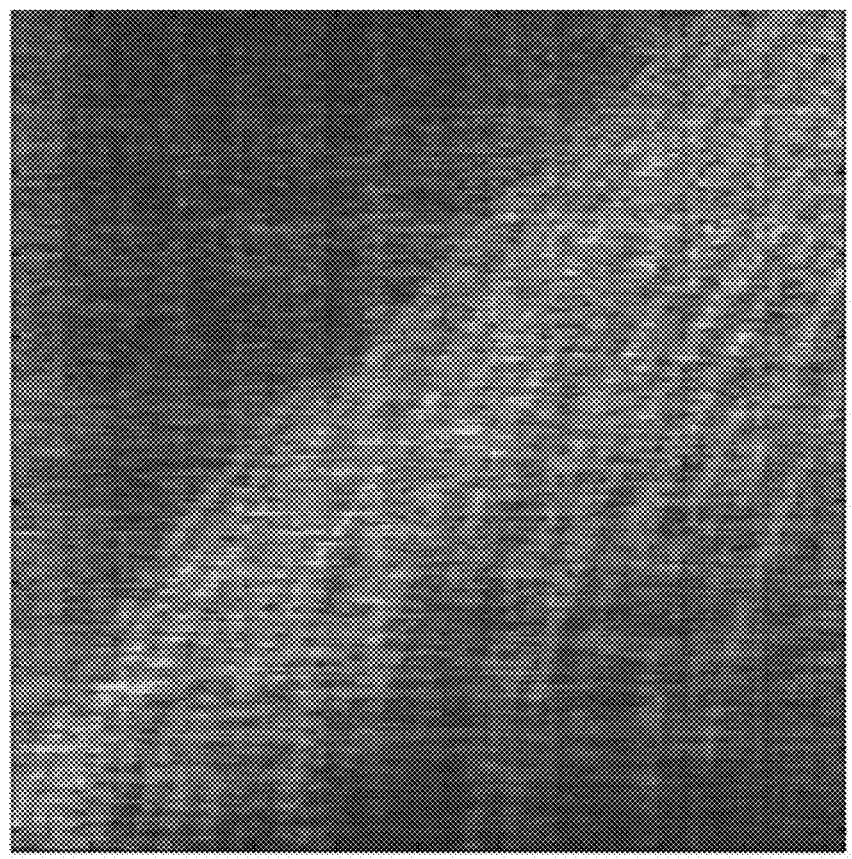
Figure 7F:
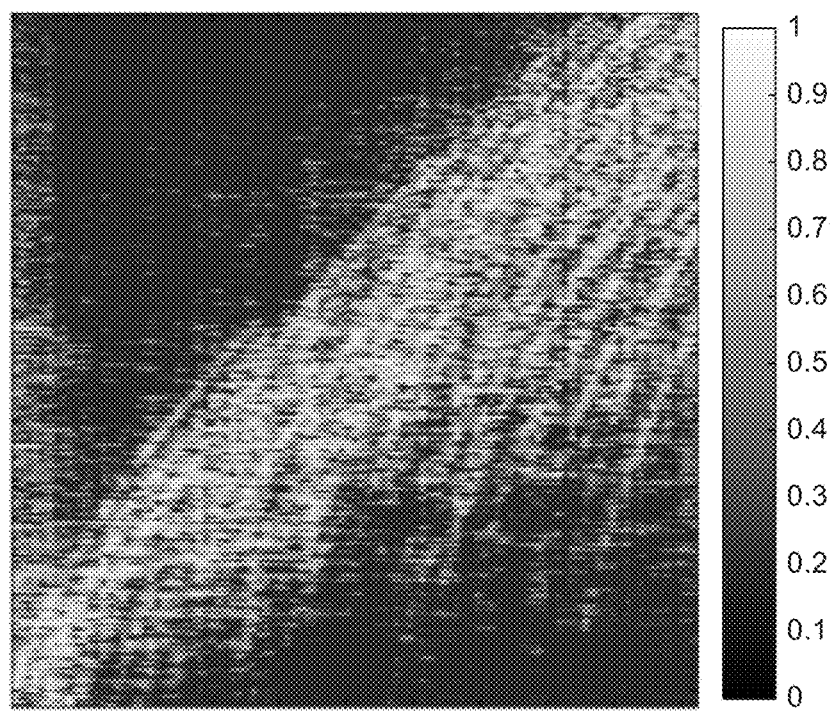

FIG. 4 illustrates a data flow diagram of an improved generative adversarial network, which relates to noisy simulation data z1, measured data z2, a generator, and a discriminator.

The noisy simulation data simulation (z1) is input to the generator for performing noise suppression to obtain a first output $G(z1)$. The first output $G(z1)$ is compared with noiseless simulation data x to obtain a first generator loss. Both the first output $G(z1)$ and the noiseless simulation data x are input into the discriminator for denoising discrimination to obtain a first discriminant result, which is used to train the discriminator. The first discriminant result may be "true", which indicates "denoising". The first discriminant result may be "fake", which indicates "not denoising". A second generator loss is determined according to the first generator loss and the first discriminate result. This process is consistent with that of the traditional generative adversarial network.

Further, the measured data measurement (z2) is further input into the generator for denoising, to obtain a second output $G(z2)$ of the generator. The second output $G(z2)$ will not directly participate in a loss of the generator, because there is no noiseless label of the measured data. The second output $G(z2)$ is continue to be input into the discriminator to obtain a second discrimination result, which will participate in the loss of the generator, thereby indirectly adding the measured data measurement (z2) to a optimization process of the neural network.

A loss function of the improved generative adversarial network is shown as follows:

$$\min_G \max_D V(D, G) = E_{x \sim p_{data}(x)}[\log D(x)] + E_{z1 \sim p_{simulation}(z1)}[\log(1 - D(G(z1)))],$$

where E(*) represents a distribution function mathematical expectation; $D(G(z1))$ represents an output of the noisy simulation data after passing through the generator and then through the discriminator; $D(x)$ represents an output of the noiseless simulation data after passing through the discriminator; $p_{data}(x)$ represents a distribution function of the noiseless simulation data; $p_{simulation}(z1)$ represents a distribution function of the noisy simulation data; data(x) represents the noiseless simulation data; and z1 represents the noisy simulation data. The loss function of the improved generative adversarial network consists of a first part and a second part. The first part is consistent with that of the traditional generative adversarial network The second part is used to supervise the measured data, and a loss function of the measured data is as follows:

$$\max_D V(D, G) = E_{z2 \sim p_{measurement}(z2)}[\log(1 - D(G(z2)))],$$

where $p_{measurement}(z2)$ represents a distribution function of the measured data; $D(G(z2))$ represents an output of the measured data after passing through the generator and then through the discriminator, and z2 represents the measured data.

A final loss function is a sum of the first part and the second part, and specific details of implementation of the network are shown in the following tables.

TABLE 1

Parameters of the generator

| Name | Channel number | Output size |
|---|---|---|
| Full connected layer 1 | 64 | 512 × 512 × 64 |
| Lrelu 1 | | 512 × 512 × 64 |
| Full connected layer 2 | 128 | 512 × 512 × 128 |
| LayerNorm 1 | | 512 × 512 × 128 |
| Lrelu 2 | | 512 × 512 × 128 |
| Full connected layer 3 | 256 | 512 × 512 × 256 |
| LayerNorm 2 | | 512 × 512 × 256 |
| Lrelu 3 | | 512 × 512 × 256 |
| Full connected layer 4 | 512 | 512 × 512 × 512 |
| LayerNorm 3 | | 512 × 512 × 512 |
| Lrelu 4 | | 512 × 512 × 512 |
| Full connected layer 5 | 1 | 512 × 512 × 1 |
| Tanh | | 512 × 512 × 1 |

TABLE 2

Parameters of the discriminator

| Name | Channel number | Output size |
|---|---|---|
| Full connected layer 6 | 512 | 512 × 512 × 512 |
| Lrelu 5 | | 512 × 512 × 512 |
| Full connected layer 7 | 256 | 512 × 512 × 256 |
| Lrelu 6 | | 512 × 512 × 256 |
| Full connected layer 8 | 1 | 512 × 512 × 1 |
| Sigmoid | | 512 × 512 × 1 |

With respect to the traditional generative adversarial network and the improved generative adversarial network of the present disclosure, intermediate results of network training thereof are taken out every 50 rounds for comparison. Effect diagrams of the intermediate results are shown in FIG. 5A through FIG. 5E and FIG. 6A through FIG. 6E. FIG. 5A through FIG. 5E illustrate a convergence process of the improved generative adversarial network. FIG. 6A through FIG. 6E illustrate a convergence process of the traditional generative adversarial network.

Through the comparison, it can be found that in the traditional generative adversarial network, not only the strength of the real signal but also the strength of the noise are continuously improved in the training process, and an ability thereof to suppress noise is limited. In contrast, in the method of the present disclosure, through adding the measured data to the training process, noise suppression can be realized, while strengths of the signals of the bird-cluster objects are improved. Noise suppression results are shown in FIG. 7A through FIG. 7F, which illustrate comparison views of the noise suppression results.

From experimental results, it can be seen that, with the method of the present disclosure, not only the noise can be eliminated well, but also the strengths of the signals of the bird-cluster objects can be improved. Further, a range resolution can be improved to some extent. In addition, the method of the present disclosure also avoids the problem that deep learning requires a lot of data training, in contrast, only a small amount of simulation data is required to denoise during the training process.

Second Embodiment

A noise suppression system for ISAR micro-cluster objects using a GAN is provided according to an embodiment of the present disclosure, which includes: a memory, and a processor, the memory contains software modules executable by the processor. The software modules include: the GAN, including a generator and a discriminator; a noisy simulation data generator, configured to: obtain noisy simulation data and input the noisy simulation data into the generator to obtain a first output $G(z1)$, compare the first output $G(z1)$ with noiseless simulation data x to obtain a first generator loss, inputting the first output $G(z1)$ and the noiseless simulation data x into the discriminator for denoising discrimination to obtain a first discriminant result, and obtain a second generator loss according to the first generator loss and the first discriminate result; and a measured data generator, configured to obtain measured data and input the measured data into the generator to obtain a second output $G(z2)$, input the second output $G(z2)$ to the discriminator to obtain a second discriminant result, and determine a generator loss according to the second generator and the second discriminate result to achieve noise suppression for the ISAR micro-cluster objects.

In an embodiment of the present disclosure, the software modules further includes: a measured data loss function calculator, configured to calculate a loss function $Loss_m$ of the measured data as follows:

$$\max_D V(D, G) = E_{z2 \sim p_{measurement}(Z2)}[\log(1 - D(G(z2)))],$$

where $p_{measurement}(z2)$ represents the distribution function of the measured data; $D(G(z2))$ represents an output of the measured data after passing through the generator and then through the discriminator; and $z2$ represents the measured data.

In an embodiment of the present disclosure, the software modules further includes: a loss function calculator, configured to calculate a loss function $Loss_s$ of the noisy simulation data is as follows:

$$\min_G \max_D V(D, G) =$$

$$E_{x \sim p_{data}(x)}[\log D(x)] + E_{z1 \sim p_{simulation}(z1)}[\log(1 - D(G(z1)))],$$

where $E(*)$ represents a distribution function mathematical expectation; $D(G(z1))$ represents an output of the noisy simulation data after passing through the generator and then through the discriminator; and $D(x)$ represents an output of the noiseless simulation data after passing through the discriminator; $p_{data}(x)$ represents a distribution function of the noiseless simulation data; $p_{simulation}(z1)$ represents a distribution function of noisy simulation data; x represents the noiseless simulation data; and $z1$ represents the noisy simulation data.

In an embodiment of the present disclosure, the software modules further includes: a GAN loss function calculator, configured to calculate a loss function of the adversarial network GAN is as follows: $Loss_{GAN} = Loss_m + Loss_s$, where $Loss_{GAN}$ represents the loss function of the adversarial network; $Loss_m$ represents a loss function of the measured data; and $Loss_s$ represents a loss function of the noisy simulation data.

The above-mentioned embodiments are merely preferred embodiments for fully explaining the present disclosure, and the scope of protection of the present disclosure is not limited thereto. Equivalent substitutions or changes made by those skilled in the art on the basis of the present disclosure are within the scope of protection of the present disclosure. The scope of protection of the present disclosure is subject to the appended claims.

What is claimed is:

1. A noise suppression method for Inverse Synthetic Aperture Radar (ISAR) micro-cluster objects using a generative adversarial network (GAN), comprising:
constructing the GAN, the GAN comprising a generator and a discriminator;
obtaining noisy simulation ISAR data of the micro-cluster objects and inputting the noisy simulation data into the generator to obtain a first output G(z1), comparing the first output G(z1) with noiseless simulation data x of the ISAR micro-cluster objects to obtain a first generator loss, inputting the first output G(z1) and the noiseless simulation data x into the discriminator for denoising discrimination to obtain a first discriminant result, and determining a second generator loss according to the first generator loss and the first discriminate result; and
obtaining measured data of the ISAR micro-cluster objects and inputting the measured data into the generator to obtain a second output G(z2), inputting the second output G(z2) to the discriminator to obtain a second discriminant result, and determining a generator loss according to the second generator and the second discriminate result, to achieve noise suppression for the ISAR micro-cluster objects.

2. The noise suppression method according to claim 1, wherein a loss function $Loss_m$ of the measured data is as follows:

$$\max_D V(D, G) = E_{z2 \sim p_{measurement}(z2)}[\log(1 - D(G(z2)))],$$

where $p_{measurement}(z2)$ represents a distribution function of the measured data; $D(G(z2))$ represents an output of the measured data after passing through the generator and then through the discriminator; and z2 represents the measured data.

3. The noise suppression method according to claim 1, wherein a loss function $Loss_s$ of the noisy simulation data is as follows:

$$\min_G \max_D V(D, G) = $$
$$E_{x \sim p_{data}(x)}[\log D(x)] + E_{z1 \sim p_{simulation}(z1)}[\log(1 - D(G(z1)))],$$

where E(*) represents a distribution function mathematical expectation; $D(G(z1))$ represents an output of the noisy simulation data after passing through the generator and then through the discriminator; $D(x)$ represents an output of the noiseless simulation data after passing through the discriminator; $p_{data}(x)$ represents a distribution function of the noiseless simulation data; $p_{simulation}(z1)$ represents a distribution function of the noisy simulation data; x represents the noiseless simulation data; and z1 represents the noisy simulation data.

4. The noise suppression method according to claim 1, wherein a loss function of the adversarial network GAN is as follows:

$$Loss_{GAN} = Loss_m + Loss_s,$$

where $Loss_{GAN}$ represents the loss function of the adversarial network; $Loss_m$ represents a loss function of the measured data; and $Loss_s$ represents a loss function of the noisy simulation data.

5. A noise suppression system for ISAR micro-cluster objects using a GAN, comprising:
a memory, stored a computer program therein; and
a processor,
wherein the processor is configured to execute the computer program to carry out a noise suppression method for ISAR micro-cluster objects using a GAN, the method comprising:
constructing the GAN, the GAN comprising a generator and a discriminator;
obtaining noisy simulation data of the ISAR micro-cluster objects and inputting the noisy simulation data into the generator to obtain a first output G(z1), comparing the first output G(z1) with noiseless simulation data data(x) of the ISAR micro-cluster objects to obtain a first generator loss, inputting the first output G(z1) and the noiseless simulation data x into the discriminator for denoising discrimination to obtain a first discriminant result, and determining a second generator loss according to the first generator loss and the first discriminate result; and
obtaining measured data of the ISAR micro-cluster objects and inputting the measured data into the generator to obtain a second output G(z2), inputting the second output G(z2) to the discriminator to obtain a second discriminant result, and determining a generator loss according to the second generator and the second discriminate result, to achieve noise suppression for the ISAR micro-cluster objects.

6. The noise suppression system according to claim 5, wherein a loss function $Loss_m$ of the measured data is as follows:

$$\max_D V(D, G) = E_{z2 \sim p_{measurement}(z2)}[\log(1 - D(G(z2)))],$$

where $p_{measurement}(z2)$ represents a distribution function of the measured data; $D(G(z2))$ represents an output of the measured data after passing through the generator and then through the discriminator; and z2 represents the measured data.

7. The noise suppression system according to claim 5, wherein a loss function $Loss_s$ of the noisy simulation data is as follows:

$$\min_G \max_D V(D, G) = $$
$$E_{x \sim p_{data}(x)}[\log D(x)] + E_{z1 \sim p_{simulation}(z1)}[\log(1 - D(G(z1)))],$$

where E(*) represents a distribution function mathematical expectation; $D(G(z1))$ represents an output of the noisy simulation data after passing through the generator and then through the discriminator; $D(x)$ represents an output of the noiseless simulation data after passing through the discriminator; $p_{data}(x)$ represents a distribution function of the noiseless simulation data; $p_{simulation}(z1)$ represents a distribution function of the noisy simulation data; x represents the noiseless simulation data; and z1 represents the noisy simulation data.

8. The noise suppression system according to claim 5, wherein a loss function of the adversarial network GAN is as follows:

$$Loss_{GAN} = Loss_m + Loss_s$$

where $Loss_{GAN}$ represents the loss function of the adversarial network; $Loss_m$ represents a loss function of the measured data; and $Loss_s$ represents a loss function of the noisy simulation data.

* * * * *